(No Model.)

W. C. SIFFKEN.
ARTIFICIAL FUEL.

No. 257,985. Patented May 16, 1882.

PERSPECTIVE VIEW.

LONGITUDINAL SECTION.

TOP VIEW.

Witnesses.
J. Roland Hett
Samuel H. Ellery

Inventor.
William Charles Siffken

UNITED STATES PATENT OFFICE.

WILLIAM C. SIFFKEN, OF VICTORIA, BRITISH COLUMBIA, CANADA.

ARTIFICIAL FUEL.

SPECIFICATION forming part of Letters Patent No. 257,985, dated May 16, 1882.

Application filed July 8, 1881. (No specimens.) Patented in Canada June 12, 1881, No. 12,965.

*To all whom it may concern:*

Be it known that I, WILLIAM CHARLES SIFFKEN, of the city of Victoria, in the Province of British Columbia, Canada, coal and wood merchant, have invented a new and useful Improvement in Artificial Fuel; and I do hereby declare that the following is a full, clear, and exact description of the same, reference being had to the annexed drawings, forming part of this specification, in which—

Figure 1:
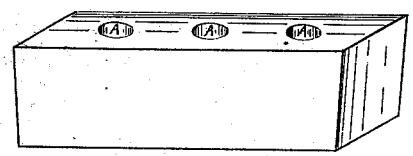
Figure 2:
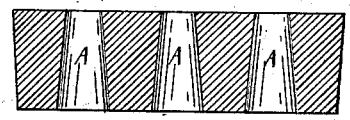
Figure 3:
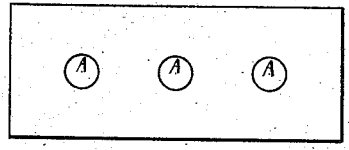

Figure 1 is a perspective view of a cake of artificial fuel; Fig. 2, a vertical section of the same, and Fig. 3 a top view.

My invention relates to artificial fuel which is composed of waste combustibles; and it has for its object a fuel which shall be made of cheap and otherwise useless materials without the employment of expensive ingredients for forming a consistent mass.

I am aware that it is common to make artificial kindling-fuel by combining comminuted coal or coke dust with sawdust saturated with petroleum and a mixture of clay and lime or plaster-of-paris. It is evident, however, that a fuel composed of said materials is too expensive to be used except for kindling cheaper fuels. Among cheaper fuels hitherto in use I know of none in which the elements are so proportioned as to give the effect of a natural fuel, it being necessary in all cases to use the artificial fuel together with a natural fuel. The cause of this is that in cheap artificial fuels the woody or vegetable element predominates, and the tendency of such a fuel is to smolder. A cheap artificial fuel, therefore, which shall secure the brilliant effect of a natural fuel at a minimum of expense, or by employing waste materials exclusively, becomes thus a desideratum in localities where natural fuels do not abound.

To this end I provide a composition consisting of ordinary coal-screenings, clay which is free from sand, sawdust, and water. These ingredients I combine in about the proportions of nine parts of the screenings, one of clay, one of sawdust, and a sufficient quantity of water to form a consistent mass. This composition is to be pressed in iron molds of various forms and sizes in the usual manner, forming openings A in the cakes to facilitate the passage of air and prevent smoldering.

It will be seen that this fuel is made entirely of cheap and otherwise useless materials, and while it may not be so well adapted to serve for kindling as the artificial fuels heretofore employed it has the advantage of utilizing waste materials in an inexpensive manner, and at the same time serving the purposes of the cheapest natural fuels.

I wish it to be understood, therefore, that I do not claim the process of forming an artificial fuel of combustible materials and molding the same into cakes having openings therein; but

What I claim as new, and desire to secure by Letters Patent, is—

An artificial fuel consisting of nine parts of coal-screenings, one of clay, one of sawdust, and a sufficient quantity of water, substantially as specified, whereby a cheap fuel shall be provided capable of producing the brilliant effects of a natural fuel, as set forth.

Victoria, 23d June, 1881.

WILLIAM CHARLES SIFFKEN.

In presence of—
T. J. WILLIAMS,
WILLIAM H. BROOKS.